United States Patent
Gonzalez et al.

(10) Patent No.: US 9,103,198 B2
(45) Date of Patent: Aug. 11, 2015

(54) SYSTEM AND METHOD FOR REMOTE SENSING

(71) Applicants: Manuel E. Gonzalez, Kingwood, TX (US); Melvin Clark Thompson, Los Alamos, NM (US); Robert Louis Williford, Los Alamos, NM (US); David William Beck, Santa Fe, NM (US)

(72) Inventors: Manuel E. Gonzalez, Kingwood, TX (US); Melvin Clark Thompson, Los Alamos, NM (US); Robert Louis Williford, Los Alamos, NM (US); David William Beck, Santa Fe, NM (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 14/543,185

(22) Filed: Nov. 17, 2014

(65) Prior Publication Data

US 2015/0070186 A1    Mar. 12, 2015

Related U.S. Application Data

(63) Continuation-in-part of application No. 13/295,784, filed on Nov. 14, 2011, now abandoned.

(60) Provisional application No. 61/413,179, filed on Nov. 12, 2010.

(51) Int. Cl.
    *E21B 47/12* (2012.01)
    *E21B 47/06* (2012.01)

(52) U.S. Cl.
    CPC .............. *E21B 47/12* (2013.01); *E21B 47/06* (2013.01); *E21B 47/122* (2013.01)

(58) Field of Classification Search
    CPC ....... E21B 47/06; E21B 47/12; E21B 17/003; E21B 41/0085; E21B 47/122
    USPC ........................ 166/250.01; 175/40; 324/338; 340/853.1, 854.4, 855.9
    See application file for complete search history.

(56) References Cited

U.S. PATENT DOCUMENTS

| | | | |
|---|---|---|---|
| 4,308,499 A * | 12/1981 | Thierbach et al. | 324/337 |
| 6,633,236 B2 * | 10/2003 | Vinegar et al. | 340/854.4 |
| 6,766,141 B1 * | 7/2004 | Briles et al. | 455/40 |
| 7,158,049 B2 * | 1/2007 | Hoefel et al. | 340/855.7 |
| 7,636,052 B2 * | 12/2009 | Coates et al. | 340/854.6 |
| 8,077,053 B2 * | 12/2011 | Thompson et al. | 340/855.7 |
| 2007/0235184 A1 * | 10/2007 | Thompson et al. | 166/250.01 |
| 2008/0253230 A1 * | 10/2008 | Thompson et al. | 367/129 |
| 2009/0159361 A1 * | 6/2009 | Coates et al. | 181/106 |
| 2009/0174409 A1 * | 7/2009 | Coates et al. | 324/338 |
| 2012/0211278 A1 * | 8/2012 | Gonzalez et al. | 175/40 |
| 2013/0257435 A1 * | 10/2013 | Smithson | 324/338 |
| 2015/0070186 A1 * | 3/2015 | Gonzalez et al. | 340/854.4 |

* cited by examiner

*Primary Examiner* — Daniel P Stephenson
(74) *Attorney, Agent, or Firm* — King & Spalding LLP

(57) ABSTRACT

A system, method and device may be used to monitor conditions in a borehole. Well tubing and casing act as a conductive pair for delivering power to one or more downhole active sensors. At the surface, power and signal are isolated so that the same conductive pair may act to transmit the sensor signals to the surface. In an embodiment, the sensor signals are RF signals and the surface electronics demodulate the RF signals from the sensor power.

19 Claims, 5 Drawing Sheets

SYSTEM AND METHOD FOR REMOTE SENSING

CROSS-REFERENCE TO RELATED APPLICATIONS

The present application is a continuation-in-part of U.S. application Ser. No. 13/295,784, filed on Nov. 14, 2011, which claims the benefit of U.S. Provisional Application No. 61/413,179, filed on Nov. 12, 2010, both of which are incorporated herein by reference in their entirety.

TECHNICAL FIELD

The present invention relates generally to remote sensing and more particularly to sensing pressures and temperatures in a downhole environment using unique sensor technology.

BACKGROUND

In resource recovery, it may be useful to monitor various conditions at locations remote from an observer. In particular, it may be useful to provide for monitoring temperatures and pressures at depth in a borehole that has been drilled either for exploratory or production purposes. Because such boreholes may extend several miles, wireless surface-powered sensor technology becomes desirable since it is not always practical to replace power sources or cables used in conventional sensors in a borehole.

SUMMARY

Generally, the present application is directed to an apparatus for monitoring conditions in a borehole. The well tubing and casing act as a conductive pair for conducting power to one or more downhole active sensors. In one aspect of the invention, power and sensor signals are isolated so that the same conductive pair may act to transmit the sensor signals to the surface.

An aspect of an embodiment of the present invention includes a system for measuring a condition in a downhole environment in a borehole beneath a surface, including an uphole source, configured and arranged to transmit a power signal via a drillstring in the borehole a sensor module, in electrical communication with the uphole source via the drillstring, the sensor module comprising an oscillator having a resonant frequency that varies with changes in the condition in the downhole environment, the sensor module being configured and arranged to receive power from the uphole source and to produce a sensor signal in response to the condition in the downhole environment and to transmit the signal, via the drillstring, toward the surface, and a detector, in electrical communication with the sensor module via the drillstring and configured and arranged to receive the sensor signal.

An aspect of an embodiment of the present invention includes a system for monitoring conditions in a borehole. The well tubing and casing act as a conductive pair for delivering power to one or more downhole active sensors. Generally, for applications described in the present application, the sensors and devices will typically consume 'low power' in the vernacular of those familiar with the art. That power will be limited to a total system current (AC root mean square (rms) or DC) of 1 Amp or less primarily limited by the design and nature of the current path at the current return, bow-spring device, and terminal end of the tubing string. Sensor signals are isolated so that the same conductive pair may act to transmit several sensor signals to the surface.

Another aspect of an embodiment of the present invention includes a method of monitoring conditions in a borehole. A power signal is transmitted via the drillstring to one or more downhole active sensors. The resultant sensor signal is transmitted via the drillstring to the surface. At each end of the drillstring, power and sensor signals are isolated.

Aspects of embodiments of the present invention include tangible computer readable media encoded with computer executable instructions for performing any of the foregoing methods and/or for controlling any of the foregoing apparatuses or systems.

DESCRIPTION OF THE DRAWINGS

The drawings illustrate only example embodiments of the present disclosure, and are therefore not to be considered limiting of its scope, as the disclosures herein may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements. In one or more embodiments, one or more of the features shown in each of the figures may be omitted, added, repeated, and/or substituted. Accordingly, embodiments of the present disclosure should not be limited to the specific arrangements of components shown in these figures.

DETAILED DESCRIPTION

Figure 1:
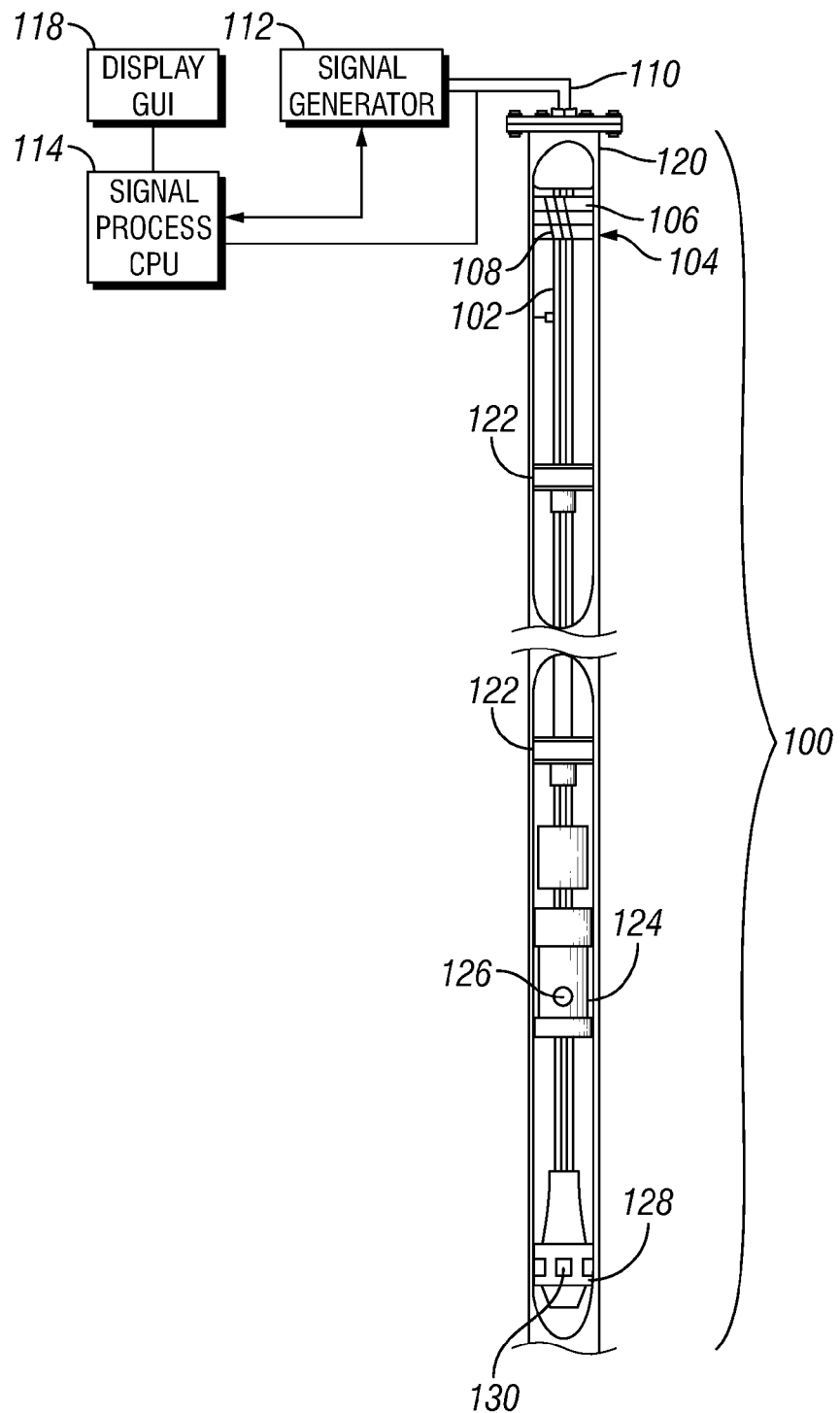
FIG. 1 is a schematic illustration of a system for interrogating a downhole environment in a borehole beneath a surface in accordance with an embodiment of the present invention.

Example embodiments directed to systems and methods for measuring a condition in a downhole environment in a borehole beneath a surface will now be described in detail with reference to the accompanying figures. Like, but not necessarily the same or identical, elements in the various figures are denoted by like reference numerals for consistency. In the following detailed description of the example embodiments, numerous specific details are set forth in order to provide a more thorough understanding of the disclosure herein. However, it will be apparent to one of ordinary skill in the art that the example embodiments disclosed herein may be practiced without these specific details. In other instances, well-known features have not been described in detail to avoid unnecessarily complicating the description. The example embodiments illustrated herein include certain components that may be replaced by alternate or equivalent components in other example embodiments as will be apparent to one or ordinary skill in the art.

Referring now to the drawings, FIG. 1 illustrates an example of an apparatus 100 for monitoring a condition in a subsurface borehole. The apparatus 100 includes an electromagnetically transmissive medium, such as a conductive line 102, for conducting electromagnetic energy through the borehole. It will be appreciated by those having ordinary skill in that art that the conductive line 102 may take different forms or embodiments, depending on the state of the borehole. Thus, for example, the conductive line 102 may comprise a production tubing string in a completed borehole or a drill-string in a borehole under construction. Near the top of the conductive line 102, a transformer 104 is provided to couple the conductive pipe to a source of electromagnetic energy. Alternate coupling methods to the transformer 104 may be employed. For example, the transmission line may directly couple to a coaxial cable or any other suitable cable.

In the example embodiment as shown, the transformer 104 includes a stack of ferrite rings 106, and a wire 108 wound around the rings. The wire 108 includes leads 110 that may be coupled to a signal generator 112 which may be configured to produce a pulsed or a continuous wave signal, as necessary or desirable. The wire 108 may further be coupled to a receiver 114. The receiver 114 may be embodied as a computer that includes a bus for receiving signals from the apparatus 100 for storage, processing and/or display. In this regard, the computer 114 may be provided with a display 118 which may include, for example, a graphical user interface.

The computer 114 may be programmed to process the received sensor signals to provide a measure of the sensed characteristic. The computer 114 may perform any desired processing of the detected signal including, but not limited to, a statistical (e.g., Fourier) analysis of the signal, a deconvolution of the signal, a correlation with another signal or the like. Commercial products are readily available and known to those skilled in the art that can be used to perform any suitable frequency detection. Alternately, the computer may be provided with a look-up table in memory or in accessible storage that correlates received modulated signals to sensed conditions in the borehole.

In a typical drilling application, the borehole will be lined with a borehole casing 120 which is used to provide structural support to the borehole. This casing 120 is frequently made from a conductive material such as steel, in which case it will cooperate with the line 102 in order to form a coaxial transmission line, and it is not necessary to provide any additional conductive medium. Where the casing is not conductive, a conductive sleeve (not shown) may be provided within the casing in order to form the coaxial structure. In order to maintain a spacing between the line 102 and the casing 120, the apparatus 100 may include dielectric rings 122 disposed periodically along the conductive line 102.

The spacers can, for example, be configured as insulated centralizers which can be disks formed from any suitable material including, but not limited to, nylon or polytetrafluoroethylene (PTFE). Though the illustrated embodiment makes use of a coaxial transmission line, it is contemplated that alternate embodiments of a transmission line may be employed, such as a single conductive line, paired conductive lines, or a waveguide. For example, the casing alone may act as a waveguide for certain frequencies of electromagnetic waves. Furthermore, lengths of coaxial cable may be used in all or part of the line. Such coaxial cable may be particularly useful when dielectric fluid cannot be used within the casing 120 (e.g., when saline water or other conductive fluid is present in the casing 120).

A probe portion 124 is located near the distal end of the apparatus 100. In principle, the probe portion may be located at any point along the length of the transmission line. Indeed, multiple such probe portions may be placed at intervals along the length. In principle, wavelength multiplexing on the coaxial line could be used to allow for multiple probes to use a single communication line without interfering with each other.

The probe portion may include a port 126 that is configured to communicate ambient pressures and/or temperatures from fluid present in the borehole into the probe where it may be sensed by the sensor (not shown in FIG. 1). Below the probe is illustrated a packer 128 and packer teeth 130.

Figure 2:
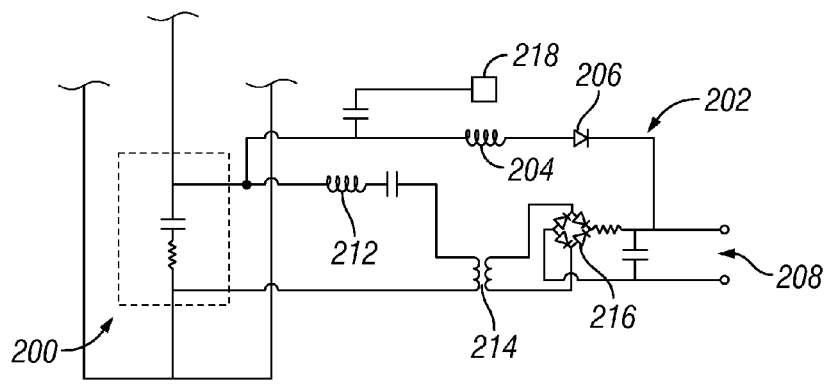
FIG. 2 is an electrical schematic diagram illustrating a circuit configured to provide DC power to a sensor in a downhole location and to accept input from the sensor for transmission to the surface.

FIG. 2 is an electrical schematic illustrating a downhole portion of an embodiment of the system in accordance with the invention. An RC (resistive-capacitive) terminator 200 is intended to reduce or eliminate reflections at the line end. From the line end, the path of the power signal depends on whether it is a DC or an AC signal. Applied DC will take the upper path 202 through the high inductance inductor 204 (which may be, for example, about 1 mH) and pass through diode 206, arriving at the DC power out 208 at the right of the Figure. On the other hand, applied AC will pass through the relatively lower inductance inductor 212 (which may be, for example, about 17 μH). The AC energy passes through a power transformer 214 and a bridge rectifier 216 to produce DC power at the same DC power out portion of the circuit 208. The sensors produce a signal (generally an RF signal) that is connected at the RF sensor input portion of the circuit 218 and coupled back to the conductive pair for transmission to the surface. Power and sensor signals can exist simultaneously on the transmission line.

The inventors have determined that an electrically isolated wellstring would enable better matching of the wellstring impedance with regard to an RF signal being propagated. Additionally, and concurrently, such an isolator would enable the transmission of AC and DC power along the tubing to power functions deeper in the well. A passive power switching method and apparatus allows selective application of power to downhole circuits and loads.

The physical implementation of a (DC) wellstring isolator generally requires robust mechanical components, which, when combined into the assembly, can reliably support up to 200,000 pounds of wellstring tubing, withstand severe coupling torques, and withstand chemical and environmental abuse.

In theory, an isolator may be nothing more than a dielectric break in an otherwise solid piece of tubing. In actual practice, such an isolator needs to fit within well casings with sufficient clearance, exhibit low end-to-end capacitance, be able to standoff many hundreds of volts of applied potential, and perhaps most importantly, be received by wellsite managers with confidence that it will not fail. Built-in failsafe design features may also be useful, or required for acceptance by users.

In accordance with an embodiment of the invention, a technique for DC isolation includes a ceramic or other non-conductive insulator inserted in series with well tubing. This may be, for example, built-in to a 4 foot section of tubing, commonly referred to as a "sub".

The ceramic and tubing parts may be clamped together and should be connected without electrically shorting the tubing parts together. An insulating coating may be applied to the internal and external surfaces of the assembly as electrical breakdown protection across the gap.

In an embodiment, the RF (sensor signal) and DC (power) connection is made to the tubing thru a common connection, with signal separation handled electronically outside the well.

Multiple mechanical topologies have been drawn and built. Many have exhibited values of electrical resistance too low for practical use. In practice, isolation values of 2,000 ohms or greater have proven useful.

Figure 3:
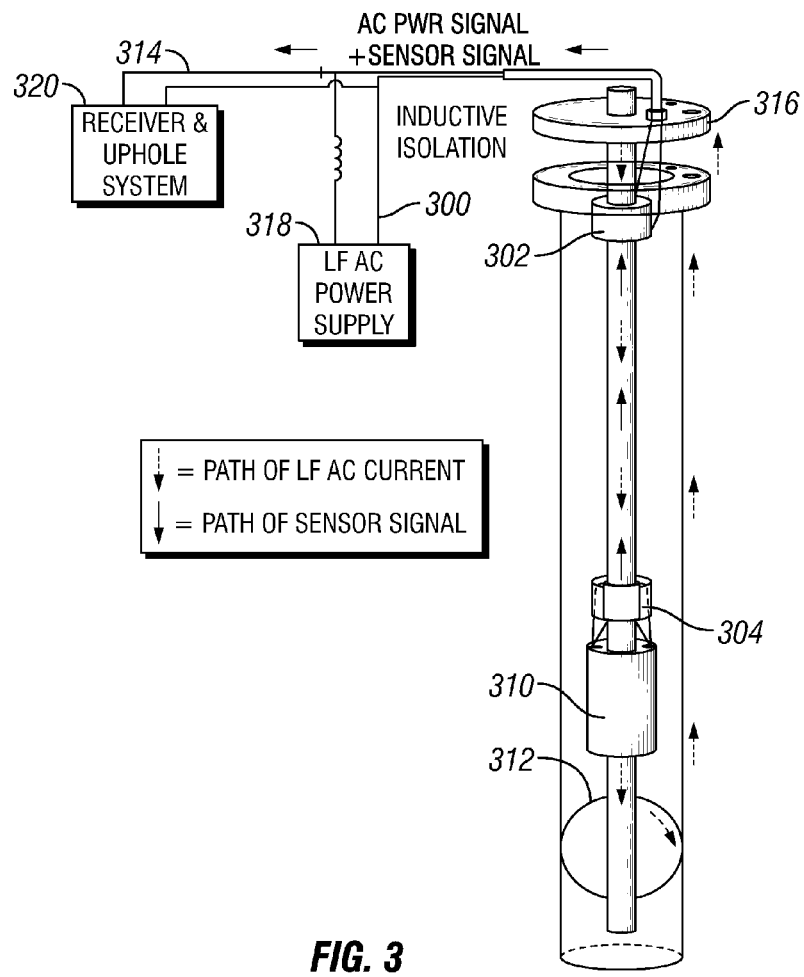
FIG. 3 is a schematic diagram illustrating an alternating current embodiment of a transmission system for power and signal for a remote sensor.
Figure 4:
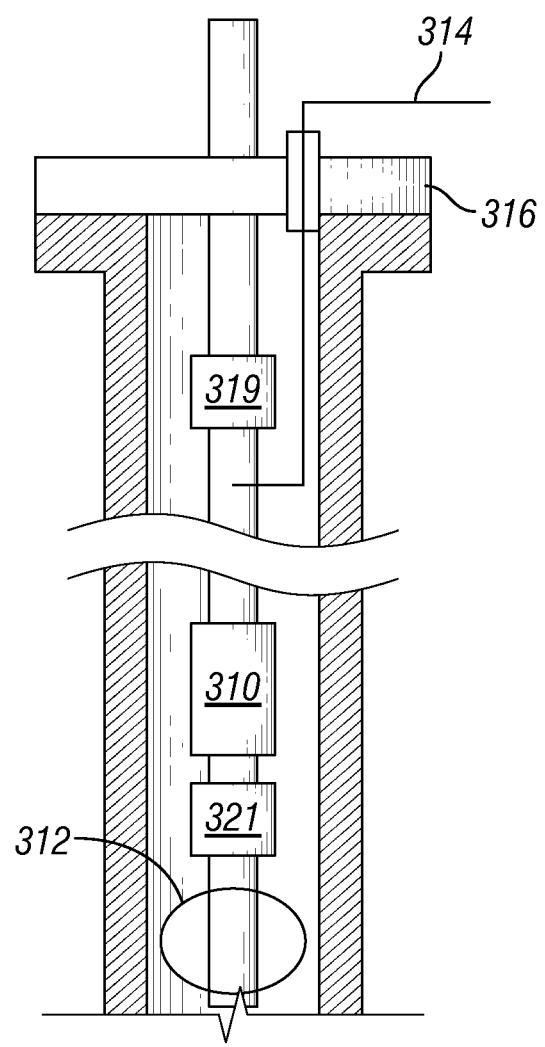
FIG. 4 is a schematic diagram illustrating a direct current embodiment of a transmission system for power and signal for a remote sensor.

An example of a set-up in accordance with an embodiment of the invention is schematically illustrated in FIG. 3. In the example of FIG. 3, the power signal generated at the surface is an AC signal delivered to input 300. The AC signal is coupled into the conductor pair via power cores 302 (or uphole transformer stack) which may be of the ferrite transformer type described above in relation to FIG. 1. In certain exemplary embodiments, the power cores 302 include ferrite rings for conducting RF sensor signals, closely positioned directly below a separate stack of tape wound toroidal cores which conduct the usually lower frequency sensor power signal to a lower transformer 304. The two different signals can exist simultaneously on the wires connecting the core to the uphole electronics set. FIG. 4 illustrates an alternate approach in which the power signal is a DC signal.

As can be seen from FIGS. 3 and 4, a primary difference in the figures, is the use of a transformer which may be, for example, a toroidal transformer made with tape wound cores on the wellstring tubing just below the wellhead and above a set of RF ferrite cores 304 (or transformer 304). In this approach, a small number of turns make up the primary of the transformer, with the well tubing making up the secondary winding of the transformer. In an example, it may be a single turn secondary winding. In certain exemplary embodiments, the lower transformer 304 is a mirror image of the uphole transformer set 304, wherein the ferrite cores are above a stack of several tape wound cores. The signal and sensor wires can be combined or isolated as needed. The sensor module 310 and bowspring centralizer 312 used in the DC isolator approach remains unchanged in such an AC application.

Figure 5:
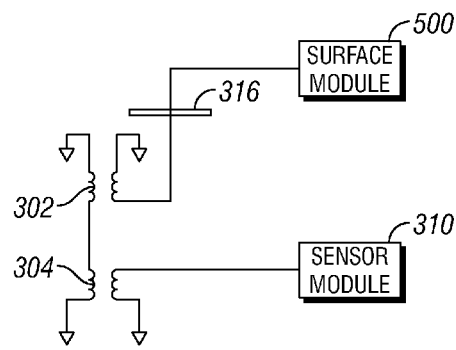
FIG. 5 is a block diagram of a transformer coupling system in accordance with an embodiment of the present invention.

In this manner, the power signals generated by power supply 318 are provided to the sensor module 310 from the lower transformer 304. In the reverse direction, the sensor module 310 generates communication signals that are transmitted to the lower transformer 304. The communication signals are conducted up the tubing string to the upper transformer 302 and then coupled to the receiver 320 of the surface system 500 (as illustrated in FIG. 5). The electrical path is completed by grounding the tubing string on the neutral sides of the upper and lower transformers and by grounding the surface system and sensor module 310. In practice, the casing is generally grounded. Thus, the tubing string above the upper transformer may be grounded by coupling the tubing string to the casing through the wellhead. The tubing string below the lower transformer 304 may be grounded by connecting the tubing string to the casing via the bowspring centralizer 312, for example.

In an embodiment, the transformers are formed by using the tubing string as one of the windings of each transformer. For example, at the upper transformer, the power signal from the surface system is transmitted to the primary winding of a toroidal transformer positioned around the tubing string. The tubing string itself is the single turn secondary winding of the transformer for the power circuit. Similarly, the lower transformer is another toroidal transformer surrounding the tubing string and includes, for the power circuit, a primary winding that is the tubing string itself and a secondary winding that is connected to the sensor module 310. In the communication circuit, signals are transmitted using the same transformers, though (as compared to the power circuit) the roles of the primary and secondary windings in each transformer are reversed.

In an embodiment, the technique for AC isolation includes an isolating transformer assembly built-up on a short section of steel tubing, incorporating AC and RF magnetics. Separate AC and RF electrical connections (300, 314 respectively) may be made through a wellhead hanger 316. A suitable impedance for the RF signal may be established by selection of the RF magnetic material. A suitable impedance for the AC source may be established by selection of the AC transformer characteristics.

In this approach, the RF impedance, established by the RF magnetics, is also affected by the presence of the AC magnetics, which represent a very high impedance to the RF. As such, it may be necessary to provide an electrical path around the AC magnetics to the wellhead for the RF currents travelling up the wellstring from the sensor package 310. In that case, two different electrical connections to the wellhead would be required.

In practice the power frequencies may be between 5 kHz and 200 kHz, for example. On the other hand, the RF frequencies for data may be between 3 MHz and 8 MHz. In an embodiment, power is supplied in a range between 1 and 10 kHz and data is transmitted using a frequency-shift keying modulation scheme at frequencies in the range between 15 and 30 kHz. Power frequencies above the RF range are, in theory, usable. Sensor data frequencies may also be selected outside the foregoing ranges. Because the transmission frequencies of the power and sensor signals are different, it is possible to separate them using filtering at either the surface system 500 and/or at the sensor module 310.

As a result of the transformer-based power and communication transmission via the drill string, there may be no need for current limiting or directing devices (i.e. devices to ensure current flows either up or down the tubing). Because there is no requirement for directing power and data transmission along the tubing string, it tends to be less susceptible to attenuation than it would if current directing devices were required. This, in turn, allows for the use of low voltage, low current (e.g., less than 10 volts and less than 0.1 amps) sensors in the sensor module. These low power sensors enable the system as a whole to tolerate significant attenuation between the power source and the downhole sensors, largely due to the ability to supply significant drive uphole.

Figure 6:
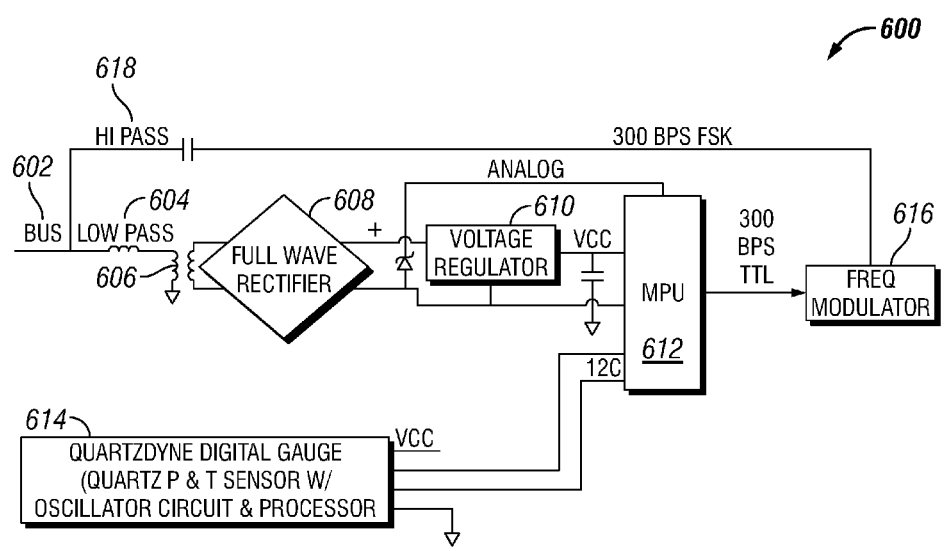
FIG. 6 is a block diagram of a sensor module assembly in accordance with an embodiment of the present invention.

FIG. 6 is a block diagram of a sensor module 600 assembly in accordance with an embodiment of the present invention. As will be appreciated the sensor module 600 is similar to the arrangement illustrated in FIG. 2 and represents an alternate approach to illustrating similar concepts.

The sensor module 600 connects to the lower transformer by way of a bus 602 that carries both the power signal and the sensor data signal. A low pass filter 604 passes the low frequency power signal to the sensor module power circuitry which is made up of a transformer 606, a rectifier 608, and a voltage regulator 610. Power is supplied to a microprocessor 612 and to one or more digital gauges 614, each of which may be, for example, a Quartzdyne® gauge, available from Quartzdyne, Inc. of Salt Lake City, Utah. Such gauges constitute a quartz resonator and are often packaged along with an accompanying oscillator circuit and processor (e.g., frequency counter), and may include reference and temperature crystals along with their respective oscillator circuitry.

Output from the gauges 614 is provided to the processor 612 which processes the data and outputs a communication signal through a frequency modulator 616. The communication signal is passed back to the tubing string by way of the bus 602 and the lower transformer. A high pass filter 618 (which may be a capacitor), in conjunction with the low pass filter 604, isolates the communication signal from the power pathway.

Figure 7:
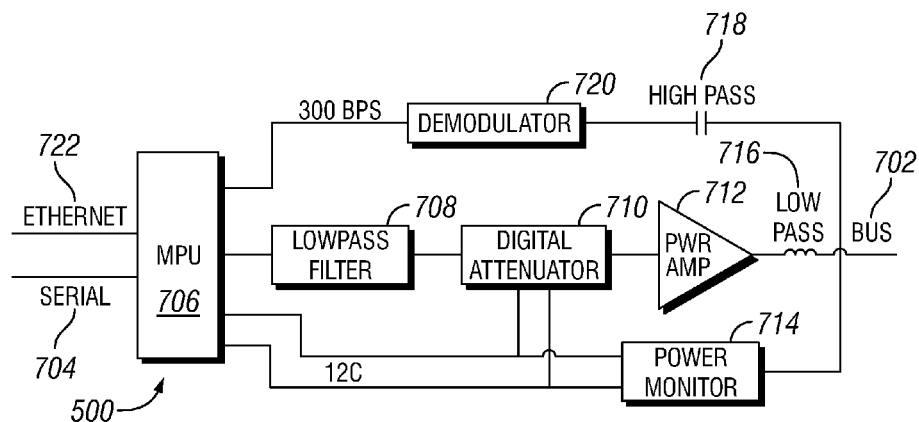
FIG. 7 is a block diagram of a sensor module interface in accordance with an embodiment of the present invention.

A portion of the surface system 500 that acts as a gauge interface module is shown in block diagram form in greater detail in FIG. 7. A bus 702 communicates with the upper transformer 302. A serial input 704 obtains power from a power supply, not shown. An MPU 706 manages the input power and outputs the power by way of a low pass filter 708, digital attenuator 710, and power amplifier 712. A power monitor 714 senses the output power and returns data on the sensed power to the MPU 706. A second low pass filter 716, which in the illustrated embodiment is an inductor, passes the power signal to the bus 702 and excludes the higher frequency data signals that are being returned from the sensor module. The data signals instead pass through a high pass filter 718 to a demodulator 720 and thence to the MPU 706. Output from the MPU may be passed via an Ethernet connection 722, or other type of connection.

Figure 8:
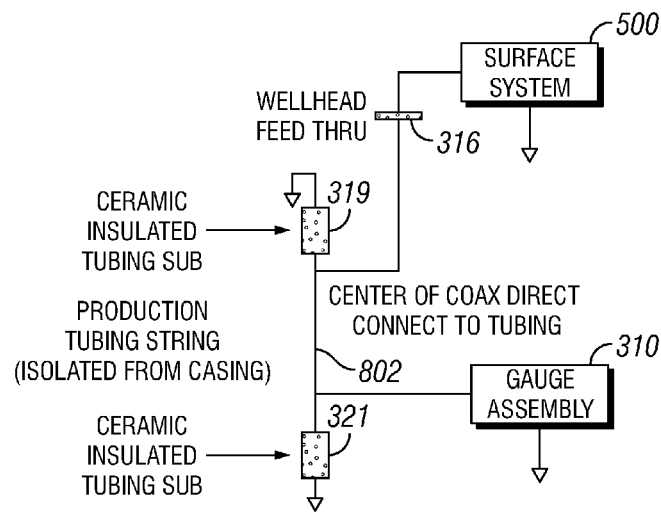
FIG. 8 is a block diagram of an insulated system in accordance with an embodiment of the present invention.

FIG. 8 is a block diagram illustrating an arrangement similar to that illustrated in FIG. 4 and represents an alternate approach to illustrating similar concepts. As described above, this approach makes use of ceramic insulated tubing subs in order to isolate a portion of the tubing. One insulating sub forms the upper isolator 319 while another forms the lower isolator 321. An intermediate tubing portion 802 becomes the transmission line for signals and power in the system. Similarly to the transformer embodiment, the tubing string conducts power signals from a connection point located just below the upper ceramic insulated tubing sub (upper insulator 319) to a connection point located just above the lower ceramic insulated tubing sub (lower insulator 321). The power signals are provided to a sensor module/gauge assembly 310 from the connection point located just above the lower insulator 321. In the reverse direction, the sensor module 310 generates communication signals that are transmitted to the connection point located just above the lower insulator 321. The communication signals are conducted up the tubing string to the connection point located just below the upper insulator 319 and then transmitted to the surface system 500. The electrical path is completed by grounding the tubing string above the upper ceramic insulated tubing sub and below the lower ceramic insulated tubing sub and by grounding the surface system and sensor module. In practice, the casing is generally grounded. Thus, the tubing string above the upper ceramic insulated tubing sub may be grounded by coupling the tubing string to the casing through the wellhead. The tubing string below the lower ceramic insulated tubing sub may be grounded by connecting the tubing string to the casing via a bowspring shorting centralizer, for example. Another embodiment of FIG. 8 comprises a system where the amplified aspect of the downhole sensor is omitted, along with any power delivering features described above. In such an embodiment, the sensors may communicate directly with the surface system 500 on the isolated tubing string suspended at the top and bottom by the ceramic insulating sub components. This non-active technique puts the oscillator crystal of the sensor in direct contact with an interrogating signal and may be effective at well depths not requiring the powered sensor approach. It would be referred to as a fully passive approach and, as such, be applied to very high temperature steam-flood wells which would damage sensor packages containing power conditioning and amplifier electronics.

In an experimental test, the inventors arranged up to 17,000' of coaxial cable that matched the losses of a field test (i.e., simulated the depth of a typical deep well). A remote full-wave AC power rectifier/filter was provided at the end of the cable to provide DC power to amplify the sensor signal.

A 60 hertz AC voltage was transmitted down the cable. It provided about 10 volts DC (out of the rectifier/filter) at the cable terminus to an amplifier circuit. An amplified sensor signal (frequency peak) was received at the surface using an HF radio detector. This setup allowed receipt of over 120 readings per second at the surface.

In an embodiment, parameters such as pressure or temperature are measured (singularly or simultaneously) at great depth using the well string hardware as both the path to power the sensors (and other associated devices), and to transport data signals from the sensors. As such, this technique uses the same conduction system for both electrical power and the signal path for the parameter data. Applied power can be DC and/or AC power at various frequencies to accommodate a multitude of lower powered remote functions.

This technique uses the well tubing and casing as a conductive pair (CP) to carry the power down to the remote, powered sensor set or other low power requirement devices. This is accomplished with a magnetic core (transformer like) AC coupler or an insulated tubing member 319 just below the tubing string hanger (at the surface) and a similar insulated tubing member 321 near the terminal end of the tubing string for a DC application. The tubing is maintained on center of the well-casing with annular insulator spacers ("centralizers") such that the conductive pair (tubing and casing) does not electrically short to each other. At the end of the tubing string, below the lower insulated tubing member there should be a conductive "packer" or bow-spring centralizer 312 or other mechanism to make contact with the casing to complete the circuit.

As will be appreciated, by uphole electronic separation/isolation of power and signal, this same conductor pair can perform as the path to the wellhead for processing of the data from the sensor set. Those familiar with the art will understand selective frequency filtering methods used here to separate power from signal and function from function. This process uses sensors that translate the parameter of interest to a low power Radio Frequency (RF) transmitter. The carrier of each transmitter is modulated to provide the imbedded data to surface level instrumentation. The RF carrier is then demodulated at the surface electronics for use.

In an embodiment, methods for commanding various low power requirement functions down-hole might be accomplished by selecting a specific power frequency that would perform various separate remote operations (i.e. multiple zone valve control, etc.) by using resonant, frequency selective networks at the remote valve location.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system for measuring a condition in a downhole environment in a borehole beneath a surface, comprising:
   a source, configured and arranged to transmit a power signal via a conductive line in the borehole;
   a sensor module, in electrical communication with the source via the conductive line, the sensor module comprising an oscillator having a resonant frequency that varies with changes in the condition in the downhole environment, the sensor module being configured and arranged to receive power from the source and to produce a sensor signal in response to the condition in the downhole environment and to transmit the signal, via the conductive line, toward the surface; and
   a detector, in electrical communication with the sensor module via the conductive line and configured and arranged to receive the sensor signal.

2. A system as in claim 1, further comprising:
   an upper transformer; configured and arranged to receive the power signal from the source, and to couple the power signal to the conductive line, and to receive the sensor signal from the conductive line and to couple the sensor signal to the detector; and
   a lower transformer, configured and arranged to receive the power signal from the conductive line and to couple the power signal to the sensor module, and to receive the sensor signal from the sensor module and to couple the sensor signal to the conductive line.

3. A system as in claim 1, further comprising:
   an upper insulator, configured and arranged to electrically isolate a portion of the conductive line from the surface; and
   a lower insulator, configured and arranged to electrically isolate the portion of the conductive line from a distal end of the conductive line, the upper insulator and lower insulator defining respective ends of a conducting portion of the conductive line for transmitting the power signal and the sensor signal.

4. A system as in claim 1, wherein the sensor module further comprises a power conditioning circuit.

5. A system as in claim 1, wherein the sensor module further comprises a filter, constructed and arranged to separate the power and data signals.

6. A system as in claim 5, wherein the filter comprises a low pass filter, configured and arranged to pass the power signal, via a power conditioning circuit, to the oscillator, and wherein the sensor module further comprises:
   a frequency modulator, configured and arranged to modulate the sensor signal for transmission to the detector; and
   a high pass filter, configured and arranged to pass the modulated sensor signal and to attenuate portions of the power signal that would otherwise be transmitted to the detector.

7. A system as in claim 1, wherein the detector and the source together comprise a surface system and wherein the surface system further comprises a filter, constructed and arranged to separate the power and data signals.

8. A system as in claim 7, wherein the filter comprises a low pass filter, configured and arranged to pass the power signal from the source to a power conditioning circuit and wherein the surface system detector further comprises:
   an additional low pass filter, configured and arranged to pass the power signal from the power conditioning circuit to the conductive line and to attenuate portions of the sensor signal that would otherwise be transmitted to the power conditioning circuit;
   a high pass filter, configured and arranged to attenuate the power signal and to pass the sensor signal to a demodulator, the demodulator being configured and arranged to demodulate the sensor signal and to pass the demodulated sensor signal to the detector.

9. A system as in claim 1, further comprising a short circuit, positioned in the borehole below the sensor module and connecting the conductive line to a casing of the borehole.

10. A system as in claim 1, wherein the conductive line comprises a drillstring.

11. A system as in claim 1, wherein the conductive line comprises production tubing.

12. A method of measuring a condition in a downhole environment in a borehole beneath a surface, comprising:
    transmitting a power signal via a conductive line in the borehole;
    receiving power from the source at a sensor module comprising an oscillator having a resonant frequency that varies with changes in the condition in the downhole environment and positioned in the downhole environment;
    transmitting a sensor signal from the sensor module toward the surface via the conductive line;
    detecting the sensor signal at the surface; and
    splitting the power signal and the sensor signal during the receiving and the detecting while allowing the power signal and the sensor signal to travel a common path via the conductive line during the transmitting.

13. A method as in claim 12, wherein the splitting the power signal and the sensor signal comprises filtering the signals on the basis of frequency.

14. A method as in claim 12, wherein the splitting the power signal and the sensor signal comprises low pass filtering a combined power and sensor signal prior to the transmitting the power signal.

15. A method as in claim 12, wherein the splitting the power signal and the sensor signal comprises high pass filtering a combined power and sensor signal prior to the detecting the sensor signal at the surface.

16. A method as in claim 12, further comprising, isolating a portion of the conductive line used in the transmitting with respective insulating sub assemblies at a top of the portion and a bottom of the portion.

17. A method as in claim 12, wherein the power and sensor signals are coupled to the conductive line by a pair of transformers, one transformer defining a top of a portion of the drillstring used in the transmitting and the other transformer defining a bottom of the portion.

18. A method as in claim 12, wherein the conductive line comprises a drillstring.

19. A method as in claim 12, wherein the conductive line comprises production tubing.

* * * * *